United States Patent [19]

Perrissin et al.

[11] Patent Number: 4,816,624
[45] Date of Patent: Mar. 28, 1989

[54] MULTIPHASE GAS EXPANSION CIRCUIT BREAKER FOR GAS-INSULATED METALCLAD CELL

[75] Inventors: Gérard Perrissin, Meylan; Joseph Marzocca, Grenoble; Lucien Marsala, Vif; Jean-Paul Robert, Meylan, all of France

[73] Assignee: Merlin Gerin, Grenoble Cedex, France

[21] Appl. No.: 139,206

[22] Filed: Dec. 29, 1987

[30] Foreign Application Priority Data

Jan. 19, 1987 [FR] France ............... 87 00624

[51] Int. Cl.⁴ ............... H01H 33/60; H01H 33/18
[52] U.S. Cl. ............... 200/148 B; 200/147 A; 200/147 R; 200/148 R; 200/148 G
[58] Field of Search ........... 200/148 B, 148 R, 148 G, 200/147 R

[56] References Cited

U.S. PATENT DOCUMENTS

| | | | |
|---|---|---|---|
| 2,459,599 | 1/1949 | Strom | 200/148 B |
| 3,183,330 | 5/1965 | Barkan et al. | 200/147 R |
| 3,183,331 | 5/1965 | Barkan | 200/147 R |
| 4,221,943 | 9/1980 | Kii | 200/148 B |
| 4,359,616 | 11/1982 | Ueda et al. | 200/148 G |

FOREIGN PATENT DOCUMENTS

| | | |
|---|---|---|
| 068951 | 1/1983 | European Pat. Off. |
| 095406 | 11/1983 | European Pat. Off. |
| 1218848 | 12/1959 | France |
| 1220038 | 1/1960 | France |
| 2354624 | 1/1978 | France |
| 580634 | 9/1946 | United Kingdom |

Primary Examiner—Robert S. Macon
Attorney, Agent, or Firm—Parkhurst, Oliff & Berridge

[57] ABSTRACT

A circuit breaker includes a plurality of poles disposed parallel side by side in a sealed enclosure (18) filled with SF6 insulating gas. The housing of each arc extinguishing chamber (22) comprises a metal shielding wall (52) designed to neutralize the influence of the magnetic stray fields of the neighbouring poles. The wall (52) can be made of conducting or ferromagnetic material, and enables correct entering of the arc favouring the expansion effect of the gas. Application: medium voltage electrical distribution substation. Refer to FIG. 1.

8 Claims, 4 Drawing Sheets

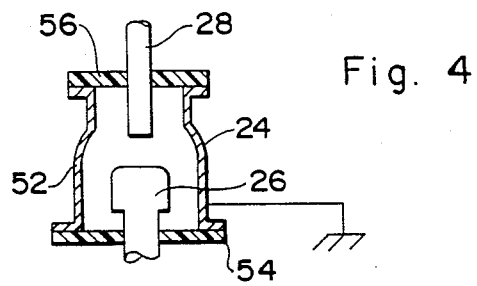
Fig. 4
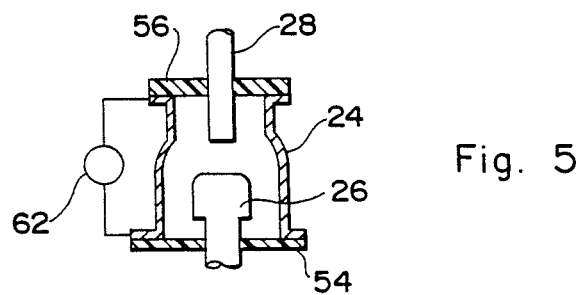
Fig. 5
Fig. 6
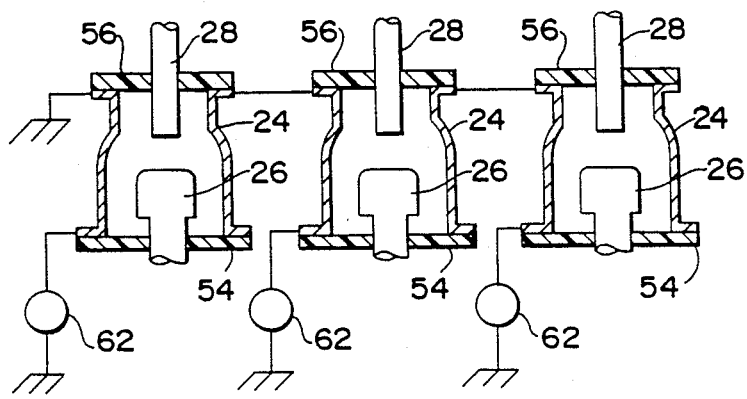

4,816,624

MULTIPHASE GAS EXPANSION CIRCUIT BREAKER FOR GAS-INSULATED METALCLAD CELL

BACKGROUND OF THE INVENTION

The invention relates to a multiphase electrical gas expansion circuit breaker having a plurality of arc extinguishing chambers arranged parallel to one another side by side in a cubicle with a sealed enclosure filled with a high dielectric strength gas, notably sulphur hexafluoride, the arc extinguishing chamber of each pole comprising:

a closed housing in which a gas pressure rise takes place due to the action of the arc, a pair of separable aligned stationary and movable contacts extending in the direction of the longitudinal axis of the housing, one at least of said contacts being hollow to ensure communication between the closed housing of each pole and of the enclosure, which forms an expansion volume for the gas extinguishing chamber.

The pole housings located in the common cubicle of a three-phase circuit breaker are generally speaking made of insulating or non-magnetic material. The electric arc developed in one of the poles is subjected to the magnetic induction generated by the neighbouring pole or poles, giving rise to a force tending to displace the arc. This stray effect of the adjacent poles is greater the closer together the poles are. A wide spacing apart of the poles enables this stray effect to be notably reduced, but this increases the overall dimensions of the cubicle.

The influence of the magnetic stray field due to the neighbouring poles is particularly harmful to arc interruption in a gas expansion circuit breaker. The lateral displacement of the arc leads to off-centering of the arc roots in relation to the longitudinal axis of the enclosure. This off-centering affects the gas outflow to the expansion volume of the cubicle, and may hinder the breaking process.

The object of the invention is to achieve a multiphase gas expansion circuit breaker having a cubicle with small dimensions, and which is insensitive to the effect of the proximity of the different poles inside the cubicle.

SUMMARY OF THE INVENTION

Each arc extinguishing chamber housing comprises a metal shielding wall designed to counteract the influence of the magnetic stray fields of the adjacent poles liable to cause radial displacement of the arc in a direction perpendicular to the longitudinal axis, said wall having a lateral revolution surface ensuring centering of the arc to favour outflow of the gas to the expansion volume of the housing through the hollow contact.

The shielding is advantageously formed by the metal wall of each housing. The presence of such a shielding between poles enables the arc centering effect to be preserved in each arc extinguishing chamber, in spite of the existence of the magnetic stray fields.

According to a preferred embodiment of the invention, the shielding wall is made of a metal material which is a good electrical conductor, arranged to be the seat of currents induced by the action of the currents flowing in the adjacent poles, said induced currents creating a magnetic compensation field which opposes the magnetic stray field due to the influence of the neighbouring poles in the arcing area. The shielding wall can be aluminium-based with a thickness of at least four millimeters. The low electrical resistivity of such a material and the sufficiently large thickness of the wall enable a large flow of induced currents in the shielding wall to be obtained, in order to counteract the stray induction.

According to an alternative embodiment of the invention, the shielding wall is made of ferromagnetic material capable of channelling the force lines of the magnetic disturbance fields generated by the neighbouring poles. The shielding wall comprises at least one air-gap designed to increase the reluctance in such a way as to prevent saturation of the wall due to the action of the field proper and of the neighbouring fields.

The expansion effect of the gas is advantageously completed by an arc rotation due to the magnetic field generated by a coil or a permanent magnet housed in each arc extinguishing chamber.

According to a development of the invention, the shielding wall of each housing is earthed so as to constitute a guard ring for each pole inside the enclosure. In addition to its shielding function, each arc extinguishing chamber housing prevents any flash-over along the creepage distance between the pole terminals.

According to a further development, the opposite ends of the conducting shielding wall are shunted by a measurement sensor of the nominal current flowing in the pole, said sensor being able to be a current transformer or a current relay.

The shielding walls of the different poles can be interconnected inside the cubicle by means of electrical connections.

BRIEF DESCRIPTION OF THE DRAWINGS

Other advantages and features will become more clearly apparent from the following description of an illustrative embodiment of the invention, given as a non-restrictive example only and represented in the accompanying drawings, in which:

FIG. 4 shows a schematic view of a pole, with earthing of the shielding housing acting as a guard ring;

FIG. 5 represents a schematic view of a pole, in association with a current measurement sensor;

FIG. 6 is an alternative embodiment of FIG. 5 for the three poles of a three-pole circuit breaker;

DESCRIPTION OF THE PREFERRED EMBODIMENT

Figure 1:
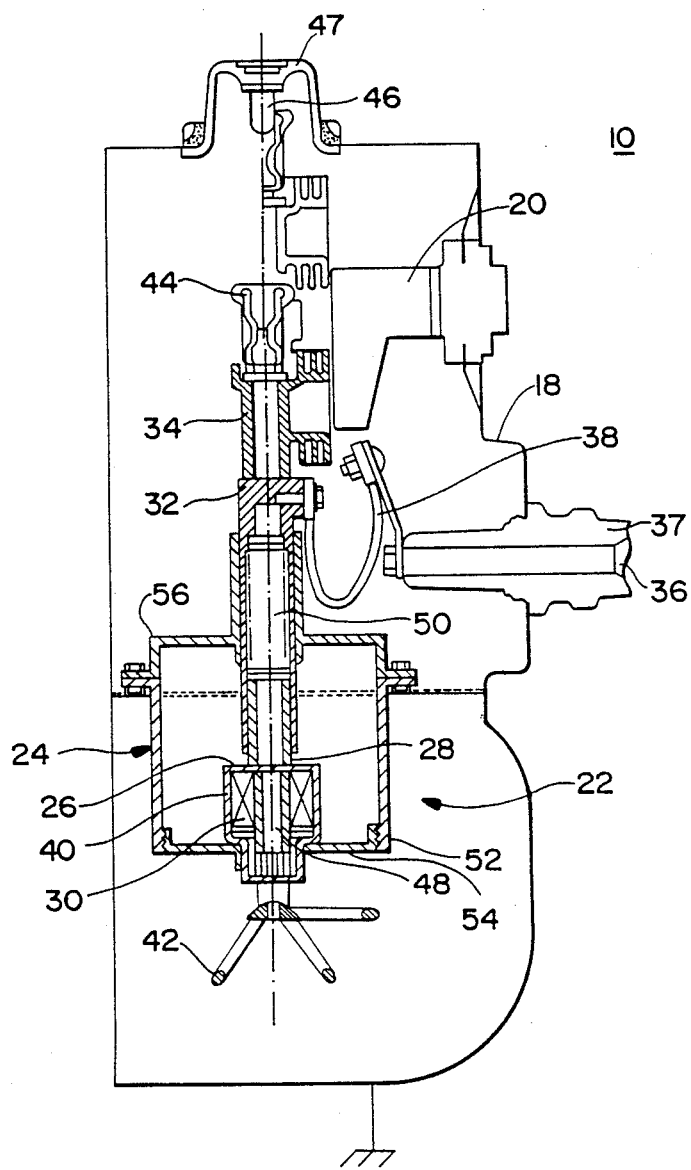
FIG. 1 is a sectional view of a three-phase circuit breaker pole with gas expansion and rotating arc according to the invention.
Figure 2:
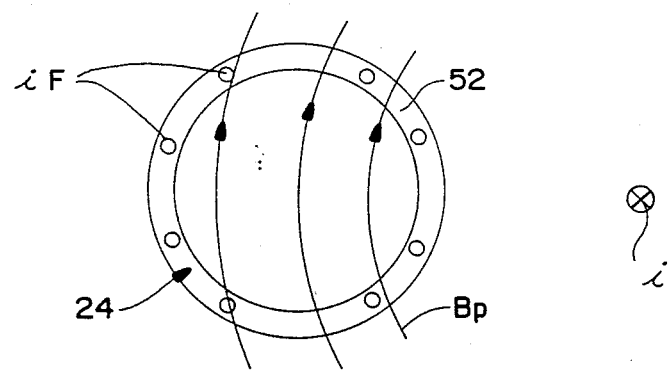
FIG. 2 shows a schematic cross-sectional view of a conducting shielding wall of a pole subjected to the influence of a magnetic stray field of a neighbouring pole.
Figure 3:
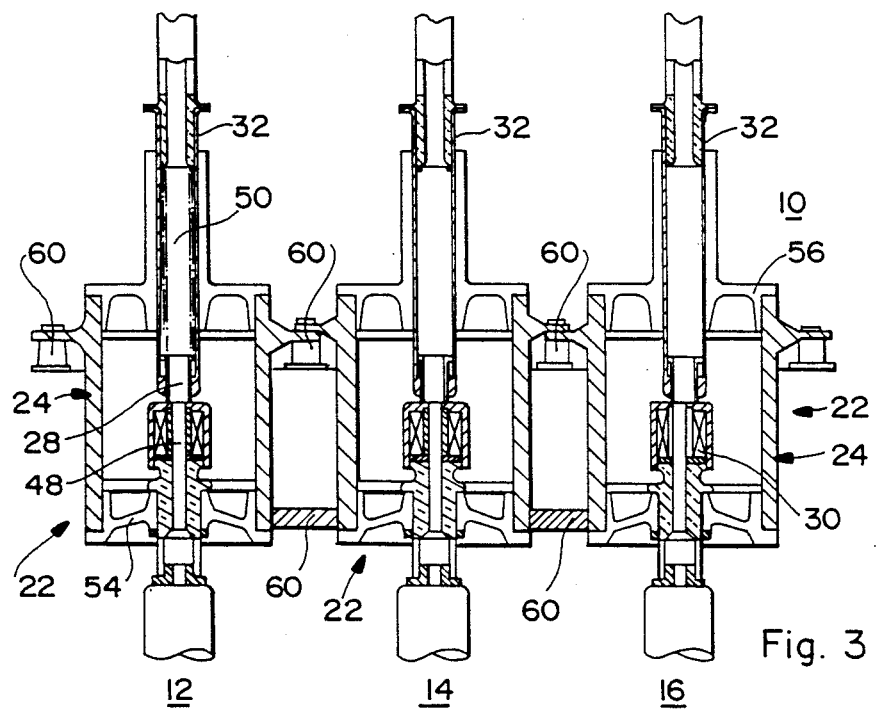
FIG. 3 represents the alignment of the three identical poles inside the sealed circuit breaker cubicle, the shape of each arc extinguishing chamber being different from that of FIG. 1.

Referring to FIGS. 1 to 3, a three-phase gas expansion circuit breaker is made up of three identical poles extending in alignment in a sealed enclosure filled with an electronegative insulating gas with a high dielectric strength, notably sulphur hexafluoride. The assembly constitutes a cubicle of a medium voltage electrical substation with integral gas insulation. The sealed metal enclosure is connected to earth, and the circuit breaker 10 is controlled by a three-position operating mechanism (not shown) coupled to a transmission crank 20 designed to displace the movable assembly of the three poles 12 to 16 in translation between a first lowered closed position F, a second intermediate open position O, and a third raised earthed position T. The three poles are arranged parallel behind one another, in such a way as to form a vertical row inside the enclosure 18.

Each pole 12 to 16 comprises an arc extinguishing chamber 22 bounded by a closed housing 24 in which a gas pressure increase takes place due to action of the arc. Inside the housing 24 there are a pair of separable contacts 26, 28, and a permanent magnet 30 causing rotation of the arc on an annular track constituted by a radial extension of the stationary contact 26. The movable contact 28 is actuated slidingly by a conducting rod 32 connected mechanically to the crank 20 by an insulating bar 34, and electrically by a flexible conductor 38 to a bushing 37 having a connection terminal 36. The stationary contact 26 is connected by a current-carrying sleeve 40 to a busbar 42 located outside the housing 24 at the bottom of the enclosure 18. Opposite the movable contact 28, the conducting rod 32 is equipped with a draw-in grip 44 able to cooperate in the third position T with an earthing stud fixed in an insulator 47 in the top part of the enclosure 18.

Outlet channels 48, 50 are arranged axially through the contacts 26, 28, the magnet 30 and the rod 32 to provide communication between the housing 24 of each pole 12 to 16 and the expansion volume of the enclosure 18.

The closed housing 24 of each arc extinguishing chamber 22 comprises a metal shielding wall 52 having a lateral revolution surface secured to two opposing insulating supports 54, 56. The metal shielding wall 52 is made of conducting material having a low electrical resistivity. The thickness of the wall 52 is greater than four millimeters when the conducting material is aluminium-based, and greater than one millimeter when the shielding wall 52 is made of copper. A magnetic stray field Bp due to the influence of the current i flowing in the nearby pole (FIG. 3) causes Foucault currents iF to flow in the aluminium metal wall 52, creating a magnetic compensation field which opposes the magnetic stray field Bp in the arc area. This results in the arc roots remaining perfectly centered in relation to the longitudinal axis of the housing 24. The arc is drawn in rotation on the stationary contact track 26 by the action of the magnetic induction field of the permanent magnet 30. The arc centering effect produced by the presence of the shielding wall 52 favours the gas outflow to the expansion volume of the enclosure 18 through the hollow contacts 26, 28. In FIG. 1, the lateral surface of the wall 52 is not straight, being notably spherical or ellipsoidal around the arcing area so as to contribute to centering of the arc by acoustic reflection, and to create a homogenous dielectric withstand profile. In FIG. 2, the lateral surface of the wall 52 is cylindrical and the housings 24 of the three poles are interconnected at their opposing ends by electrical connections 60 so that the Foucault currents flow in loops contributing to reducing the influences of stray inductions.

According to an alternative embodiment, the shielding wall 52 is made of ferromagnetic material, notably steel, in order to channel the induction lines of the magnetic stray fields, and to prevent any radial displacement of the rotating arc. The arc roots of the latter remain anchored inside the hollow contacts 26, 28 to favour gas expansion of the gas.

In FIG. 4, the aluminium shielding wall 52 is completely earthed to constitute a guard ring of each pole inside the enclosure 18.

Referring now to FIG. 5, the conducting shielding of the housing 24 can be used to supply a sensor 62 measuring the nominal current flowing in the phase conductors. The sensor 62 is connected to the opposing ends of the aluminium wall 52 by a shunt circuit. The sensor 62 can be comprised of a relay designed to detect a pole current threshold overshoot, by measuring the voltage between the two ends of the wall 52. The sensor 62 can also be formed by a current transformer.

According to FIG. 6, the top ends of the shielding walls 52 of the three juxtaposed poles are interconnected and are at earth potential. Each bottom end of the wall 52 is earthed via a current sensor.

It is clear that the permanent magnet 30 can be replaced by an electromagnetic coil, and that the three poles of the three-phase circuit breaker extend inside the enclosure 18 according to the parallel edges of a straight prism.

Figure 7:
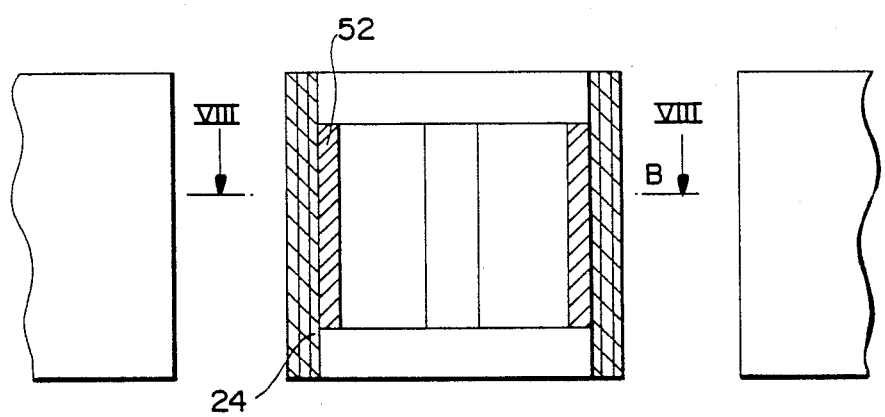
FIG. 7 is a sectional view of an alternative embodiment of the invention along the line VII—VII of FIG. 8.
Figure 8:
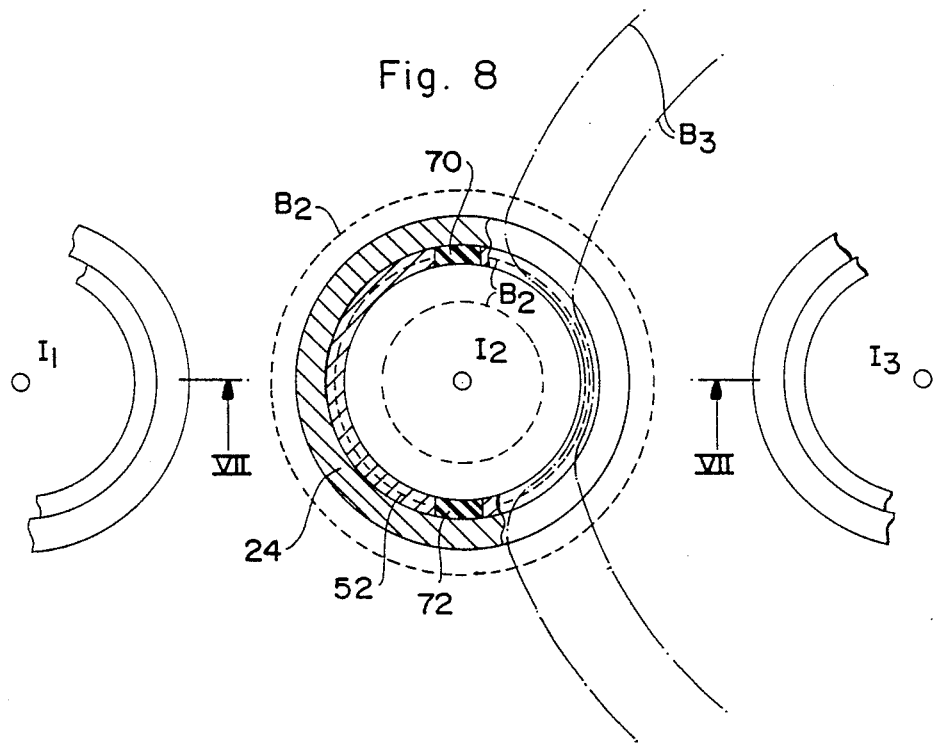
FIG. 8 is a sectional view along the line VIII—VIII of FIG. 7.

In FIGS. 7 and 8, the cylindrical enclosure 24 is made of insulating plastic material, notably polycarbonate, comprising inside facing the contacts, a ferromagnetic coaxial shielding wall 52, notably made of steel, equipped with two diametrically opposed air-gaps 70, 72. The air-gaps 70, 72 are made of non-magnetic material, such as copper, and are arranged perpendicularly to the alignment plane of the three poles of the circuit breaker. The magnetic reluctance of the shielding wall 52 of each pole is increased by the presence of the air-gaps 70, 72 in such a way as to prevent saturation of the wall 52 due to the action of the field proper, for example B2, and of the neighbouring stray fields B3 and B1 channelled by the wall 52. The field proper B2 of the intermediate pole is induced by the current I2. The neighbouring field B3 of the right-hand pole is induced by the current I3. The neighbouring field B1 of the left-hand pole is induced by the current I1.

We claim:

1. A multiphase electrical gas expansion circuit breaker having a plurality of arc extinguishing chambers arranged parallel to one another side by side in a cubicle with a sealed enclosure filled with a high dielectric strength gas, the arc extinguishing chamber of each pole comprising:

a closed housing in which a gas pressure rise takes place due to the action of the arc, a pair of separable aligned stationary and movable contacts extending in the direction of the longitudinal axis of the housing, at least one of said contacts being hollow to ensure communication between the closed housing of each pole and of the enclosure, which forms an expansion volume for the gas extinguishing chamber, a metal shielding wall arranged in the housing of each chamber so as to counteract the influence of the magnetic stray fields of the adjacent poles liable to cause radial displacement of the arc in a direction perpendicular to the longitudinal axis, said wall having a lateral revolution surface ensuring centering of the arc to favor outflow of the gas towards said expansion volume through the hollow contact, an annular electrode electrically connected to the stationary contact and coaxially surrounded by said shielding wall, and magnetic arc rotating means for causing the arc to rotate on a track of said annular electrode, said means including an electromagnetic coil or a hollow permanent magnet, located in each arc extinguishing chamber.

2. A multiphase electrical gas expansion circuit breaker according to claim 1, wherein said shielding wall is made of a metal material which is a good electrical conductor, arranged to be the seat of currents induced by the action of the currents flowing in the adjacent poles, said induced currents creating a magnetic compensation field which counteracts the magnetic stray field due to the influence of the neighboring poles in the arcing area.

3. A multiphase electrical gas expansion circuit breaker according to claim 2, wherein the shielding wall is made of aluminium, with a thickness greater than four millimeters.

4. A multiphase electrical gas expansion circuit breaker according to claim 1, wherein the shielding wall is made of ferromagnetic material capable of channelling the force lines of the magnetic disturbance fields generated by the neighboring poles, said wall comprising a pair of air-gaps diametrically opposed in relation to the alignment plane of the poles.

5. A multiphase electrical gas expansion circuit breaker, according to claim 2, including a pair of connection terminals in electrical connection with the separable contacts of each pole, the shielding wall of each housing being earthed so as to constitute a guard ring for each pole inside the enclosure.

6. A multiphase electrical gas expansion circuit breaker according to claim 2, including a current sensor which is connected in parallel at the opposite ends of said conducting shielding wall so as to measure the nominal current flowing in the pole.

7. A multiphase electrical gas expansion circuit breaker according to claim 1, having electrical connections which interconnect the shielding walls of the different poles inside the cubicle.

8. A multiphase electrical gas expansion circuit breaker according to claim 2, wherein the shielding wall is made of copper, with a thickness greater than one millimeter.

* * * * *